US011340628B2

(12) United States Patent
Yu et al.

(10) Patent No.: US 11,340,628 B2
(45) Date of Patent: May 24, 2022

(54) MARKER-COMBINED SIMULTANEOUS LOCALIZATION AND MAPPING NAVIGATION METHOD, DEVICE AND SYSTEM

(71) Applicant: Beijing Geekplus Technology Co., Ltd., Beijing (CN)

(72) Inventors: Yufeng Yu, Beijing (CN); Hongbo Li, Beijing (CN); Kai Liu, Beijing (CN); Zheng Wang, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 693 days.

(21) Appl. No.: 16/315,574

(22) PCT Filed: Aug. 16, 2018

(86) PCT No.: PCT/CN2018/100869
§ 371 (c)(1),
(2) Date: Jan. 4, 2019

(87) PCT Pub. No.: WO2019/034115
PCT Pub. Date: Feb. 21, 2019

(65) Prior Publication Data
US 2021/0333797 A1 Oct. 28, 2021

(30) Foreign Application Priority Data

Aug. 16, 2017 (CN) .......................... 201710703818.3

(51) Int. Cl.
G05D 1/02 (2020.01)

(52) U.S. Cl.
CPC ......... *G05D 1/0234* (2013.01); *G05D 1/0225* (2013.01)

(58) Field of Classification Search
CPC ........................... G05D 1/0234; G05D 1/0225
See application file for complete search history.

(56) References Cited

U.S. PATENT DOCUMENTS

| 7,693,654 B1 * | 4/2010 | Dietsch | .................. | G01C 21/20 |
| | | | | 701/461 |
| 10,656,654 B2 * | 5/2020 | Li | .......................... | G01S 17/931 |

(Continued)

FOREIGN PATENT DOCUMENTS

| CN | 102402225 A | 4/2012 |
| CN | 103294059 A | 9/2013 |

(Continued)

OTHER PUBLICATIONS

Extended European Search Report dated Apr. 3, 2020 for EP application EP18832973.4.

*Primary Examiner* — Ramsey Refai
(74) *Attorney, Agent, or Firm* — Stoel Rives LLP

(57) ABSTRACT

Provided are a marker-combined simultaneous localization and mapping (SLAM) navigation method, device and system. The method includes: providing an initialization area for a located object, where at least one of the initialization area for a located object, a travelling path of a located object, and a docking device of the located object is provided with an marker including at least one of pose information, identification information and non-identification graphic information; controlling the located object to perform at least one of following operations: starting from the initialization area for a located object, and based on the marker, determining an initial pose of the located object; when the marker is passed on the travelling path, updating a current pose of the located object based on the marker; and when docking with the docking device, adjusting a relative pose between the located object and the docking device based on the marker.

20 Claims, 12 Drawing Sheets

(56) References Cited

U.S. PATENT DOCUMENTS

| | | | |
|---|---|---|---|
| 10,656,659 B2* | 5/2020 | Li | G05D 1/02 |
| 2008/0077511 A1* | 3/2008 | Zimmerman | G05D 1/0246 |
| | | | 705/28 |
| 2009/0030551 A1* | 1/2009 | Hein | G08B 19/005 |
| | | | 700/253 |
| 2011/0121068 A1* | 5/2011 | Emanuel | G01S 5/16 |
| | | | 235/375 |
| 2014/0022281 A1 | 1/2014 | Georgeson et al. | |
| 2015/0253766 A1* | 9/2015 | Pettersson | G05B 19/41805 |
| | | | 700/168 |
| 2016/0154408 A1 | 6/2016 | Eade et al. | |
| 2017/0029213 A1* | 2/2017 | Johnson | G05D 1/0276 |
| 2017/0105592 A1 | 4/2017 | Fong et al. | |
| 2017/0225891 A1* | 8/2017 | Elazary | B65G 1/1375 |

FOREIGN PATENT DOCUMENTS

| | | |
|---|---|---|
| CN | 103869814 A | 6/2014 |
| CN | 104062973 A | 9/2014 |
| CN | 104142683 A | 11/2014 |
| CN | 104848858 | 8/2015 |
| CN | 104848858 A | 8/2015 |
| CN | 106323294 | 1/2017 |
| CN | 106527432 A | 3/2017 |
| CN | 106708051 A | 5/2017 |
| CN | 106803261 A | 6/2017 |
| CN | 106989746 A | 7/2017 |
| CN | 107727104 A | 2/2018 |
| EP | 2903787 | 8/2015 |
| JP | 2015535373 | 12/2015 |

\* cited by examiner

MARKER-COMBINED SIMULTANEOUS LOCALIZATION AND MAPPING NAVIGATION METHOD, DEVICE AND SYSTEM

CROSS REFERENCE TO RELATED APPLICATIONS

This application is a United States national phase application of international patent application number PCT/CN2018/100869 which claims priority to a Chinese patent application No. 201710703818.3 filed on Aug. 16, 2017, disclosures of both of which are incorporated herein by reference in their entireties.

TECHNICAL FIELD

The present disclosure relates to an autonomous navigation field, for example, relates to a marker-combined simultaneous localization and mapping (SLAM) navigation method, device and system.

BACKGROUND

In a laser radar-based or vision-based simultaneous localization and mapping (SLAM) navigation solution, locating may be performed in real time in a completely unknown scene, and a two-dimensional (2D)/three-dimensional (3D) map of the scene may be built.

For example, for a completely unknown environment, the SLAM system continuously locates and updates a map based on an initialization pose during the travelling of the located object to generate the initialization-pose-based map. In addition, for an environment in which the map has been established, the SLAM system searches and matches the map in the initialization pose region, obtains initial pose information, and continuously locates and updates the map while the located object is travelling.

SLAM navigation does not require a placement of markers in the scene, and has become an important branch of the indoor navigation solutions by virtue of its convenience. The accuracy of the SLAM navigation mainly depends on the accuracy of loop closing. When the scene becomes larger, the map closing cannot be effectively performed, which will greatly affect the locating and mapping effect. In addition, the accuracy of the SLAM system is affected by the accuracy of a sensor. A low-cost SLAM system cannot meet a precise locating required by the conveyor belt docking and mechanical arm operation.

Therefore, based on the above problems, an improved simultaneous localization and mapping navigation method, device and system are needed.

SUMMARY

The present disclosure provides a novel and improved marker-combined simultaneous localization and mapping navigation method, device and system.

The present disclosure provides a marker-combined simultaneous localization and mapping navigation method, including: providing an initialization area for a located object; adding a first marker in the initialization area for a located object, where the first marker includes pose information or identification information; enabling the located object to start from the initialization area for the located object and determine an initial pose of the located object based on the first marker; adding a second marker on a travelling path of the located object; and updating a current pose of the located object based on the second marker when the located object passes the second markers.

In the above-mentioned marker-combined simultaneous localization and mapping navigation method, the located object is one of a robot that travels in simultaneous localization and mapping navigation and a mobile device that carries a conveyor belt, a shelf, a cage, and a mechanical arm.

In the above-mentioned marker-combined simultaneous localization and mapping navigation method, the first marker includes the pose information, and determining the initial pose of the located object based on the first marker includes: directly determining initial pose information of the located object by performing a coordinate transformation on the pose information carried in the first marker base on a relative pose between the first marker and the located object.

In the above-mentioned marker-combined simultaneous localization and mapping navigation method, the first marker includes the identification information, and determining the initial pose of the located object based on the first marker includes: using the identification information carried in the first marker for matching, recording a plurality of pieces of pose information and error covariance matrixes of the located object, and transforming the plurality of pieces of pose information and error covariance matrixes of the located object into a plurality of pieces of pose information and error covariance matrixes of the first marker; fusing the plurality of pieces of pose information of the first marker to estimate optimal pose information and an error covariance matrix of the first marker via a Gaussian model; and directly determining initial pose information of the located object by performing a coordinate transformation on the optimal pose information carried in the first marker based on a relative pose between the first marker and the located object.

In the above-mentioned marker-combined simultaneous localization and mapping navigation method, the second marker includes the pose information, the identification information or the non-identification graphic information.

In the above-mentioned marker-combined simultaneous localization and mapping navigation method, the second marker includes the pose information, and updating the current pose of the located object based on the second marker includes: directly determining current pose information of the located object by performing a coordinate transformation on the pose information carried in the second marker based on a relative pose between the second marker and the located object.

In the above-mentioned marker-combined simultaneous localization and mapping navigation method, the second marker includes the identification information, and updating the current pose of the located object based on the second marker includes: using the identification information carried in the second marker for matching, recording a plurality of pieces of pose information and error covariance matrixes of the located object, and transforming the plurality of pieces of pose information and error covariance matrixes of the located object into a plurality of pieces of pose information and error covariance matrixes of the second marker; fusing the plurality of pieces of pose information to estimate optimal pose information and an error covariance matrix of the second marker via the Gaussian model; and directly determining current pose information of the located object by performing a coordinate transformation on the optimal pose carried in the second marker based on a relative pose between the second marker and the located object.

In the above-mentioned marker-combined simultaneous localization and mapping navigation method, the second marker includes the non-identification graphic information, and updating the current pose of the located object based on the second marker includes: using a similarity of poses when the located object passes the same marker to determine whether a marker that the located object passes is the second marker; recording a plurality of pieces of pose information and error covariance matrixes of the located object passing the second marker, and transforming the plurality of pieces of pose information and error covariance matrixes of the located object into a plurality of pieces of pose information and error covariance matrixes of the second marker; fusing the plurality of pieces of pose information of the second marker to estimate optimal pose information and an error covariance matrix of the second marker via the Gaussian model; and based on the pose of the second marker relative to the located object, directly determining current pose information of the located object by performing a coordinate transformation on the optimal pose carried in the second marker based on a relative pose between the second marker and the located object.

In the above-mentioned marker-combined simultaneous localization and mapping navigation method, when a plurality of second markers are provided, adding the second markers on the travelling path of the located object includes: adding the plurality of second markers on the travelling path of the located object. When the located object passes each of the second markers, updating the current pose of the located object based on each of the second markers further includes: when the located object passes the plurality of second markers, updating the current poses of the located object based on the plurality of second markers.

In the above-mentioned marker-combined simultaneous localization and mapping navigation method, an auxiliary locating belt connecting the second markers is provided between two adjacent second markers among the plurality of second markers for correcting an angular deviation of the located object relative to the auxiliary locating belt as the located object passes the auxiliary locating belt such that the located object travels along the auxiliary locating belt, ensuring that the second markers may be passed and the second marker can be identified by the located object.

The above-mentioned marker-combined simultaneous localization and mapping navigation method further includes that: a third marker is added on the docking device on the travelling path of the located object; and when the located object passes the third marker, a docking operation with the docking device is completed based on the third marker.

The application provides an marker-combined simultaneous localization and mapping navigation device, including: an initialization area setting unit, configured to provide an initialization area for a located object; a first marker adding unit, configured to add a first marker in the initialization area for a located object, where the first marker includes pose information or identification information; a located object starting unit, configured to enable the to start from the initialization area for the located object, and determine an initial pose of the located object based on the first marker; a second marker adding unit, configured to add a second marker on a travelling path of the located object; and a pose updating unit, configured to, update a current pose of the located object based on the second marker when the located object passes the second marker.

In the above-mentioned marker-combined simultaneous localization and mapping navigation device, the located object includes one of a robot that travels in simultaneous localization and mapping navigation and a mobile device that carries a conveyor belt or a mechanical arm.

In the above-mentioned marker-combined simultaneous localization and mapping navigation device, the first marker includes the pose information, and the located object starting unit is further configured to: directly determine initial pose information of the located object by performing a coordinate transformation on the pose information carried in the first marker base on a relative pose between the first marker and the located object.

In the above-mentioned marker-combined simultaneous localization and mapping navigation device, the first marker includes the identification information, and the located object starting unit is further configured to: use the identification information carried in the first marker for matching, record a plurality of pieces of pose information and error covariance matrixes of the located object, and transform the plurality of pieces of pose information and error covariance matrixes of the located object into a plurality of pieces of pose information and error covariance matrixes of the first marker; fuse the plurality of pieces of pose information to estimate an optimal pose information and error covariance matrix of the first marker via a Gaussian model; and based on a pose of the first marker relative to the located object, directly determine initial pose information of the located object by performing a coordinate transformation on the optimal pose information carried in the first marker based on a relative pose between the first marker and the located object.

In the above-mentioned marker-combined simultaneous localization and mapping navigation device, the second marker includes the pose information, the identification information or the non-identification graphic information.

In the above-mentioned marker-combined simultaneous localization and mapping navigation device, the second marker includes the pose information, and the pose updating unit is further configured to: based on a pose of the second marker relative to the located object, directly determine current pose information of the located object by performing a coordinate transformation on the pose information carried in the second marker based on a relative pose between the second marker and the located object.

In the above-mentioned marker-combined simultaneous localization and mapping navigation device, the second marker includes the identification information, and the pose updating unit is further configured to: use the identification information carried in the second marker for matching, record a plurality of pieces of pose information and error covariance matrixes of the located object, and transform the plurality of pieces of pose information and error covariance matrixes of the located object into a plurality of pieces of pose information and error covariance matrixes of the second marker; fuse the plurality of pieces of pose information to estimate an optimal pose information and error covariance matrix of the second marker via the Gaussian model; and based on a pose of the second marker relative to the located object, directly determine current pose information of the located object by performing a coordinate transformation on the optimal pose carried in the second marker based on a relative pose between the second marker and the located object.

In the above-mentioned marker-combined simultaneous localization and mapping navigation device, the second marker includes the non-identification graphic information, and the pose updating unit is configured to: use a similarity of poses when the located object passes the same marker to determine whether an marker that the located object passes is the second marker; record a plurality of pieces of pose information and error covariance matrixes of the located object passing the second marker, and transform the plurality of pieces of pose information and error covariance matrixes of the located object into a plurality of pieces of pose information and error covariance matrixes of the second marker; fuse the plurality of pieces of pose information of the second marker to estimate an optimal pose information and error covariance matrix of the second marker via the Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation device, when a plurality of second markers are provided, the first marker adding unit is further configured to add the plurality of second markers on the travelling path of the located object, and the pose updating unit is configured to update the current poses of the located object based on the plurality of second markers when the located object passes the plurality of second markers.

In the above-mentioned marker-combined simultaneous localization and mapping navigation device, an auxiliary locating unit is further included and configured to add an auxiliary locating belt connecting two adjacent second markers between the two adjacent second markers among the plurality of second markers and correct an angular deviation of the located object relative to the auxiliary locating belt as the located object passes the auxiliary locating belt such that the located object travels along the auxiliary locating belt.

The above-mentioned marker-combined simultaneous localization and mapping navigation device further includes a third marker adding unit, configured to add a third marker onto the docking device on the travelling path of the located object; and a docking unit, configured to complete a docking operation with the docking device based on the third marker when the located object passes the third marker.

The present disclosure provides a marker-combined simultaneous localization and mapping navigation system, including: a located object configured to locate and build a map in real time in a scene; a first marker including pose information or identification information; a second marker; and a simultaneous localization and mapping device. The simultaneous localization and mapping device includes an initialization area setting unit, configured to provide an initialization area for a located object; a first marker adding unit, configured to add a first marker into the initialization area for a located object; a located object starting unit, configured to enable the located object to start from the initialization area for a located object, and determine an initial pose of the located object based on the first marker; a second marker adding unit, configured to add a second marker on a travelling path of the located object; and a pose updating unit, configured to update a current pose of the located object based on the second marker when the located object passes the second marker.

In the above-mentioned marker-combined simultaneous localization and mapping navigation system, the located object includes one of a robot that travels in simultaneous localization and mapping navigation and a mobile device that carries a conveyor belt or a mechanical arm.

In the above-mentioned marker-combined simultaneous localization and mapping navigation system, the first marker includes the pose information, and the located object starting unit is further configured to: directly determine initial pose information of the located object by performing a coordinate transformation on the pose information carried in the first marker base on a relative pose between the first marker and the located object.

In the above-mentioned marker-combined simultaneous localization and mapping navigation system, the first marker includes the identification information, and the located object starting unit is configured to: use the identification information carried in the first marker for matching, record a plurality of pieces of pose information and error covariance matrixes of the located object, and transform the plurality of pieces of pose information and error covariance matrixes of the located object into a plurality of pieces of pose information and error covariance matrixes of the first marker; fuse the plurality of pieces of pose information to estimate an optimal pose information and error covariance matrix of the first marker via a Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation system, the second marker includes the pose information, the identification information or the non-identification graphic information.

In the above-mentioned marker-combined simultaneous localization and mapping navigation system, the second marker includes the pose information, and the pose updating unit is further configured to: directly determine current pose information of the located object by performing a coordinate transformation on the pose information carried in the second marker based on a relative pose between the second marker and the located object.

In the above-mentioned marker-combined simultaneous localization and mapping navigation system, the second marker includes the identification information, and the pose updating unit is further configured to: use the identification information carried in the second marker for matching, record a plurality of pieces of pose information and error covariance matrixes of the located object, and transform the plurality of pieces of pose information and error covariance matrixes of the located object into a plurality of pieces of pose information and error covariance matrixes of the second marker; fuse the plurality of pieces of pose information to estimate an optimal pose information and error covariance matrix of the second marker via the Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation system, the second marker includes the non-identification graphic information, and the pose updating unit is further configured to: use a similarity of poses when the located object passes the same marker to determine whether an marker that the located object passes is the second marker; record a plurality of pieces of pose information and error covariance matrixes of the located object passing the second marker, and transform the plurality of pieces of pose information and error covariance matrixes of the located object into a plurality of pieces of pose information and error covariance matrixes of the second marker; fuse the plurality of pieces of pose information of the second marker to estimate an optimal pose information and error covariance matrix of the second marker via the Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation system, when a plurality of second markers are provided, the first marker adding unit is further configured to add the plurality of second markers on the travelling path of the located object, and the pose updating unit is configured to update the current poses of the located object based on the plurality of second markers when the located object passes the plurality of second markers.

In the above-mentioned marker-combined simultaneous localization and mapping navigation system, an auxiliary locating unit is included between two adjacent second markers among the plurality of second markers, and the simultaneous localization and mapping device further includes: an auxiliary locating unit configured to correct an angular deviation of the located object relative to the auxiliary locating belt as the located object passes the auxiliary locating belt such that the located object travels along the auxiliary locating belt.

The above-mentioned marker-combined simultaneous localization and mapping navigation system further includes a third marker adding unit, configured to add a third marker onto the docking device on the travelling path of the located object; and a docking unit, configured to complete a docking operation with the docking device based on the third marker when the located object passes the third marker.

The present application provides a marker-combined simultaneous localization and mapping navigation method, including: providing an initialization area for a located object, where at least one of the initialization area for a located object, a travelling path of the located object, and a docking device of the located object is provided with an marker including at least one of pose information, identification information and non-identification graphic information; controlling the located object to perform at least one of following operations: starting from the initialization area for a located object, and determining an initial pose of the located object based on the marker; when the located object passes the marker on the travelling path, updating a current pose of the located object based on the marker; and when the located object docks with the docking device, adjusting a relative pose between the located object and the docking device based on the marker.

In an embodiment, the located object includes a robot that travels in simultaneous localization and mapping navigation and a mobile device that needs to dock with the docking device.

In an embodiment, the docking device includes a conveyor belt or a mechanical arm.

In an embodiment, a marker provided in the initialization area for a located object is a first marker including the pose information, and determining the initial pose of the located object based on the first marker includes: directly determining initial pose information of the located object by performing a coordinate transformation on the pose information carried in the first marker base on a relative pose between the first marker and the located object.

In an embodiment, the marker provided in the initialization area for a located object is the first marker including the identification information, and determining the initial pose of the located object based on the first marker includes: when the located object starts from the first marker, recording identification information carried in the first marker, and locate and make a map by using the identification information as a coordinate origin; when the located object repeatedly passes the first marker for multiple times, obtain the pose information of the located object by using the identification information carried in the first marker to perform matching, recording a plurality of pieces of pose information and errors of the located object, and transforming the plurality of pieces of pose information and errors of the located object into a plurality of pieces of pose information and errors of the first marker; fusing the plurality of pieces of pose information of the first marker to estimate optimal pose information and an error of the first marker via a Gaussian model; and directly determining initial pose information of the located object by performing a coordinate transformation on the optimal pose information carried in the first marker based on a relative pose between the first marker and the located object.

In an embodiment, a marker set on the travelling path of the located object is a second marker including the pose information, and updating the current pose of the located object based on the second marker includes: directly determining current pose information of the located object by performing a coordinate transformation on the pose information carried in the second marker based on a relative pose between the second marker and the located object.

In an embodiment, the marker provided on the travelling path of the located object is the second marker including the identification information, and updating the current pose of the located object based on the second marker includes: when the located object repeatedly passes the second marker for multiple times, obtaining the pose information of the located object by using the identification information carried in the second marker to perform matching, recording a plurality of pieces of pose information and errors of the located object, and transforming the plurality of pieces of pose information and errors of the located object into a plurality of pieces of pose information and errors of the second marker; fusing the plurality of pieces of pose information of the second marker via a Gaussian model to estimate optimal pose information and an error of the second marker; and directly determining current pose information of the located object by performing a coordinate transformation on the optimal pose information carried in the second marker based on a relative pose between the second marker and the located object.

In an embodiment, the marker provided on the travelling path of the located object is the second marker including the non-identification graphic information, and updating the current pose of the located object based on the second marker includes: determining whether a marker that the located object repeatedly passes is the second marker by using a similarity of poses when the located object passes the same marker; if the second marker is determined, recording a plurality of pieces of pose information and errors of the located object passing the second marker, and transforming the plurality of pieces of pose information and errors of the located object into a plurality of pieces of pose information and errors of the second marker; fusing the plurality of pieces of pose information of the second marker to estimate optimal pose information and an error of the second marker via the Gaussian model; and directly determining current pose information of the located object by performing a coordinate transformation on the optimal pose information carried in the second marker based on a relative pose between the second marker and the located object.

In an embodiment, the marker provided on the travelling path of the located object is the second marker, and a plurality of second markers are provided.

In an embodiment, an auxiliary locating belt connecting two adjacent second markers is provided between the two adjacent second markers among the plurality of second markers for correcting an angular deviation of the located object relative to the auxiliary locating belt as the located object passes the auxiliary locating belt, such that the located object travels along the auxiliary locating belt.

The present disclosure provides a marker-combined simultaneous localization and mapping navigation device, including: an initialization area setting unit, a located object starting unit, a pose updating unit and a docking unit. The initialization area setting unit is configured to provide an initialization area for a located object, where at least one of the initialization area for a located object, a travelling path of the located object, and a docking device of the located object is provided with a marker including at least one of pose information, identification information and non-identification graphic information. The located object starting unit is configured to control the located object to perform at least one of following operations: starting from the initialization area for the located object, and determining an initial pose of the located object based on the marker. The pose updating unit is configured to update a current pose of the located object based on the marker when the located object passes the marker on the travelling path. The docking unit is configured to adjust a relative pose between the located object and the docking device based on the marker when the located object docks with the docking device.

In an embodiment, the located object includes a robot that travels in simultaneous localization and mapping navigation and a mobile device that needs to dock with the docking device.

In an embodiment, the docking device includes a conveyor belt or a mechanical arm.

In an embodiment, a marker provided in the initialization area for the located object is a first marker including the pose information, and the located object starting unit is further configured to: directly determine initial pose information of the located object by performing a coordinate transformation on the pose information carried in the first marker base on a relative pose between the first marker and the located object.

In an embodiment, the marker provided in the initialization area for the located object is the first marker including the identification information, and the located object starting unit is further configured to: when the located object starts from the first marker, record identification information carried in the first marker, and locate and make a map by using the identification information as a coordinate origin; when the located object repeatedly passes the first marker for multiple times, obtain the pose information of the located object by using the identification information of the first marker to perform matching, record a plurality of pieces of pose information and errors of the located object, and transform the plurality of pieces of pose information and errors of the located object into a plurality of pieces of pose information and errors of the first marker; fuse the plurality of pieces of pose information of the first marker to estimate optimal pose information and an error of the first marker via a Gaussian model; and directly determine initial pose information of the located object by performing a coordinate transformation on the optimal pose information carried in the first marker based on a relative pose between the first marker and the located object.

In an embodiment, a marker provided on the travelling path of the located object is a second marker including the pose information, and the pose updating unit is further configured to: directly determine current pose information of the located object by performing a coordinate transformation on the pose information carried in the second marker based on a relative pose between the second marker and the located object.

In an embodiment, the marker provided on the travelling path of the located object is the second marker including the identification information, and the pose updating unit is further configured to: when the located object repeatedly passes the second marker for multiple times, obtain the pose information of the located object by using the identification information carried in the second marker, record a plurality of pieces of pose information and errors of the located object, and transform the plurality of pieces of pose information and errors of the located object into a plurality of pieces of pose information and errors of the second marker; fuse the plurality of pieces of pose information of the second marker via a Gaussian model to estimate an optimal pose information and error of the second marker; and directly determine current pose information of the located object by performing a coordinate transformation on the optimal pose information carried in the second marker based on a relative pose between the second marker and the located object.

In an embodiment, the marker provided on the travelling path of the located object is the second marker including the non-identification graphic information, and the pose updating unit is configured to: determine whether a marker that the located object repeatedly passes is the second marker by using a similarity of poses when the located object passes the same marker; if the second marker is determined, record a plurality of pieces of pose information and errors of the located object passing the second marker, and transform the plurality of pieces of pose information and errors of the located object into a plurality of pieces of pose information and errors of the second marker; fuse the plurality of pieces of pose information of the second marker via the Gaussian model to estimate optimal pose information and an error of the second marker; and directly determine current pose information of the located object by performing a coordinate transformation on the optimal pose information carried in the second marker based on a relative pose between the second marker and the located object.

In an embodiment, the marker provided on the travelling path of the located object is the second marker, and a plurality of second markers are provided.

In an embodiment, an auxiliary locating unit is further included and configured to add an auxiliary locating belt connecting two adjacent second markers between the two adjacent second markers among the plurality of second markers and correct an angular deviation of the located object relative to the auxiliary locating belt as the located object passes the auxiliary locating belt such that the located object travels along the auxiliary locating belt.

The present application provides an marker-combined simultaneous localization and mapping navigation system, including: a located object configured to locate and build a map in real time in a scene; an marker including at least one of pose information, identification information and non-identification graphic information; and a simultaneous localization and mapping device. The simultaneous localization and mapping device includes an initialization area setting unit, configured to provide an initialization area for a located object, where at least one of the initialization area for a located object, a travelling path of the located object, and a docking device of the located object is provided with a marker; a located object starting unit, configured to control the located object to perform at least one of the following operations: starting from the initialization area for the located object, and determining an initial pose of the located object based on the first marker; a pose updating unit, configured to update a current pose of the located object based on the second marker when the located object passes the second marker; and a docking unit, configured to adjust a relative pose between the located object and the docking device based on the marker when docking with the docking device.

In an embodiment, the located object includes a robot that travels in simultaneous localization and mapping navigation and a mobile device that needs to dock with the docking device.

In an embodiment, the docking device includes a conveyor belt or a mechanical arm.

In an embodiment, a marker provided in the initialization area for the located object is a first marker including the pose information, and the located object starting unit is configured to: directly determine initial pose information of the located object by performing a coordinate transformation on the pose information carried in the first marker base on a relative pose between the first marker and the located object.

In an embodiment, the marker provided in the initialization area for the located object is the first marker including the identification information, and the located object starting unit is configured to: when the located object starts from the first marker, record identification information carried in the first marker, and locate and make a map by using the identification information as a coordinate origin; when the located object repeatedly passes the first marker for multiple times, obtain the pose information of the located object by using the identification information carried in the first marker to perform matching, record a plurality of pieces of pose information and errors of the located object, and transform the plurality of pieces of pose information and errors of the located object into a plurality of pieces of pose information and errors of the first marker; fuse the plurality of pieces of pose information of the first marker to estimate optimal pose information and an error of the first marker via a Gaussian model; and directly determine initial pose information of the located object by performing a coordinate transformation on the optimal pose information carried in the first marker based on a relative pose between the first marker and the located object.

In an embodiment, a marker provided on the travelling path of the located object is a second marker including the pose information, and the pose updating unit is further configured to: directly determine current pose information of the located object by performing a coordinate transformation on the pose information carried in the second marker based on a relative pose between the second marker and the located object.

In an embodiment, the marker provided on the travelling path of the located object is the second marker including the identification information, and the pose updating unit is further configured to: when the located object repeatedly passes the second marker for multiple times, obtain the pose information of the located object by using the identification information carried in the second marker to perform matching, record a plurality of pieces of pose information and errors of the located object, and transform the plurality of pieces of pose information and errors of the located object into a plurality of pieces of pose information and errors of the second marker; fuse the plurality of pieces of pose information of the second marker via a Gaussian model to estimate optimal pose information and an error of the second marker; and directly determine current pose information of the located object by performing a coordinate transformation on the optimal pose information carried in the second marker based on a relative pose between the second marker and the located object.

In an embodiment, the marker provided on the travelling path of the located object is the second marker including the non-identification graphic information, and the pose updating unit is further configured to: determine whether a marker that the located object repeatedly passes is the second marker by using a similarity of poses when the located object passes the same marker; if the second marker is determined, record a plurality of pieces of pose information and errors of the located object passing the second marker, and transform the plurality of pieces of pose information and errors of the located object into a plurality of pieces of pose information and errors of the second marker; fuse the plurality of pieces of pose information of the second marker via the Gaussian model to estimate optimal pose information and an error of the second marker; and directly determine current pose information of the located object by performing a coordinate transformation on the optimal pose information carried in the second marker based on a relative pose between the second marker and the located object.

In an embodiment, the marker provided on the travelling path of the located object is the second marker, and a plurality of second markers are provided.

In an embodiment, an auxiliary locating unit is included between two adjacent second markers among the plurality of second markers, and the simultaneous localization and mapping device further includes: an auxiliary locating unit configured to correct an angular deviation of the located object relative to the auxiliary locating belt as the located object passes the auxiliary locating belt such that the located object travels along the auxiliary locating belt.

DETAILED DESCRIPTION

Figure 1:
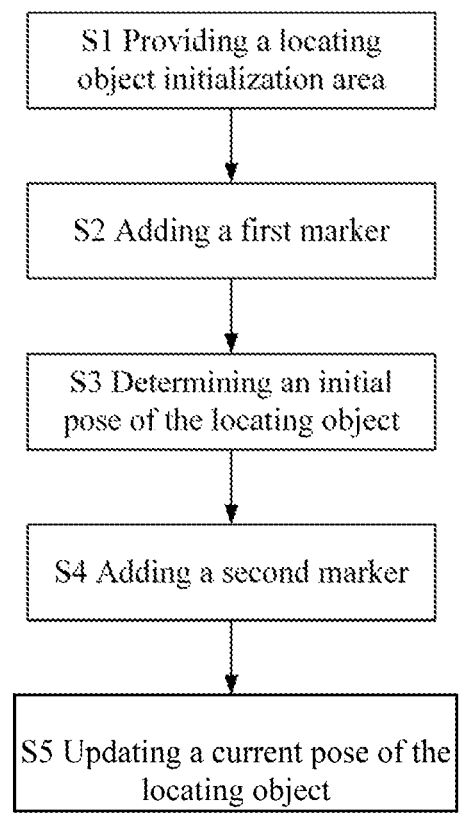
FIG. 1 is a flowchart showing a marker-combined simultaneous localization and mapping navigation method according to an embodiment of the present disclosure.

The present disclosure is disclosed by the following description so as to be implemented by those skilled in the art. The preferred embodiment in the following description is used merely as an example, and those skilled in the art may conceive of other obvious variations. The basic principles, as defined in the following description, of the present disclosure may be applied to other embodiments, modifications, improvements, equivalents, and other technical solutions without departing from the spirit and scope of the present disclosure.

The terms and words used in the specification and claims below are not limited to the literal meaning, but are merely used by the inventor to make the present disclosure clearly and consistently understood. Therefore, it is obvious to those skilled in the art that embodiments of the present disclosure are provided for illustrating instead of limiting the present disclosure as defined in the appended claims and equivalents thereof.

It should be understood that, the term "one" should be interpreted as "at least one" or "one or more". That is, the number of an element may be one in an embodiment and the number of the element may be above one in another embodiment. The term "one" should not be interpreted to limit the number.

Since ordinal numbers such as "first" and "second" are used to describe various components and the ordinal number is not intended to limit these components herein. The term is merely used to distinguish between one component and another component. For example, a first component may be referred to as a second component, and similarly, the second component may be referred to as the first component, without departing from the concept of the present application. The term "and/or" used herein includes any or all combinations of one or more listed associated items.

Terms used herein are only used to describe an embodiment and not intended to limit the present disclosure. As used herein, a singular form is intended to include a plural from, unless clearly indicated in the context. In addition, it is to be understood that the terms "including" and/or "having" used in the specification are intended to mean the existence of the described features, numbers, steps, operations, components, elements or combinations thereof, without excluding the existence or addition of one or more other features, numbers, steps, operations, components, elements, or combinations thereof.

The terms used herein, including technical and scientific terms, have the same meanings as the terms commonly understood by those skilled in the art, as long as the terms are not defined differently. It should be understood that the terms defined in the commonly used dictionaries have consistent meanings with the terms in the existing art.

The present disclosure will be described in detail in conjunction with drawings and embodiments.

The present disclosure provides a marker-combined simultaneous localization and mapping navigation method, including: providing an initialization area for a located object; adding a first marker in the initialization area for a located object, where the first marker includes pose information or identification information; enabling the located object to start from the initialization area for a located object, and determining an initial pose of the located object based on the first marker; adding a second marker on a travelling path of the located object; and when the located object passes the second marker, updating a current pose of the located object based on the second marker.

FIG. 1 is a flowchart showing a marker-combined simultaneous localization and mapping navigation method according to an embodiment of the present application. As shown in FIG. 1, the marker-combined simultaneous localization and mapping navigation method according to the embodiment of the present disclosure includes steps S1 to S5.

In S1, providing an initialization area for a located object.

In S2, adding a first marker in the initialization area for a located object, where the first marker includes pose information or identification information.

In S3, enabling the located object to start from the initialization area for the located object, and determining an initial pose of the located object based on the first marker.

In S4, adding a second marker on a travelling path of the located object.

In S5, when the located object passes the second marker, updating a current pose of the located object based on the second marker.

Therefore, by using the marker-combined simultaneous localization and mapping navigation method according to the embodiment of the present disclosure, the problems of unclear initialization pose of the located object and pose offset during the traveling process in existing related art are solved, thereby reaching high precision and robustness of the SLAM navigation method which may be adapted to industrial environments that require precise locating.

In an embodiment, by providing the initialization area for a located object, adding the first marker therein, and enabling the located object to start from the initialization area for a located object, determining an initial pose of the located object based on the first marker, which may solve the problem of unclear initialization pose of the located object. In this way, by performing simultaneous localization and mapping based on clear initialization pose information, the navigation result of the SLAM navigation system may be matched with the real environment, thereby facilitating a combination of the navigation system and the real application. In addition, if the locating is performed with an already known map, the initial pose of the located object may be constrained to achieve a successful match with the map.

Additionally, by adding a marker on the travelling path of the located object, the locating deviation generated by the SLAM navigation system during the traveling process of the located object may be corrected, thereby facilitating map closing and improving mapping and locating effects.

The above-mentioned marker-combined simultaneous localization and mapping navigation method further includes: adding a plurality of second markers on the travelling path of the located object; and when the located object passes the plurality of second markers, updating the current pose of the located object based on the plurality of second markers.

That is, in the marker-combined SLAM navigation method according to the embodiment of the present disclosure, in order to correct the offset generated by the locating of the SLAM navigation system during the traveling process of the located object, in a large scene, a plurality of markers are added on the travelling path of the located object, so that when the located object passes each marker, the current pose of the located object passing the marker is updated based on the marker in real time, thereby reducing the cumulative offset of the located object moving in the large scene, and avoiding the SLAM navigation system from being unable to perform closing detection.

Those skilled in the art may understand that based on different application scenarios, multiple objects may be provided as the located object in the marker-combined SLAM navigation method according to the embodiment of the present disclosure. For example, for the common SLAM navigation method and navigation system, a robot for real-time locating and mapping is provided, and for precise locating of a conveyor belt docking, mechanical arm operation, and the like, a conveyor belt, a mechanical arm or the like for precise locating is provided.

Therefore, in the above-mentioned marker-combined SLAM navigation method, the located object may be a robot traveling in SLAM navigation, or a device or a equipment used in a scene such as the conveyor belt docking or the mechanical arm operation.

In the marker-combined simultaneous localization and mapping navigation method according to the embodiment of the present disclosure, the marker may have various forms depending on the method of determining the pose of the located object based on the marker.

Figure 2:
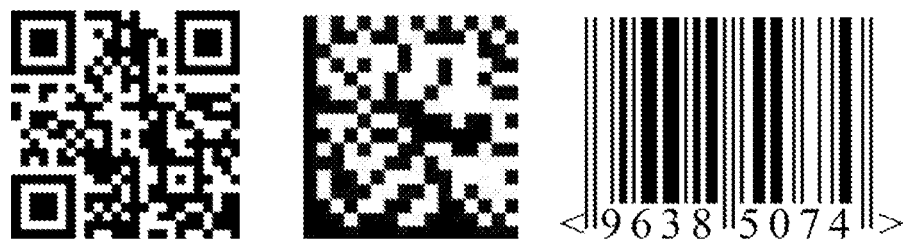
FIG. 2 is a schematic diagram showing an example of markers according to an embodiment of the present disclosure.

For example, the marker may be artificial markers such as a two-dimensional code (quick response code (QR code), Data Matrix and other encoding forms), a barcode, and other visual identifications, as shown in FIG. 2. FIG. 2 is a schematic diagram showing an example of markers according to an embodiment of the present disclosure.

Additionally, markers may be divided into multiple types according to different storage information. For example, one type of marker includes pose information (x, y, another type of marker includes only identification (ID) information and no pose information, and another type of marker may include non-identification graphic information.

As the type of markers is different, the corresponding application method of determining the pose of the located object based on the marker is also different, which will be described in detail below.

Firstly, for the marker including the pose information, information stored in the marker code word includes at least the actual location (x, y) of the marker in the scene. When an angle of the marker is deviated, the angle θ information needs to be provided in the code word.

The robot in the SLAM navigation system is provided as an example to describe a specific method of determining a position of the located object based on the marker below. Of course, it should be understood by those skilled in the art that the located object is not limited to robots, and may also be above-mentioned mobile devices applied to scenes such as the conveyor belt docking or the mechanical arm operation.

Figure 3:
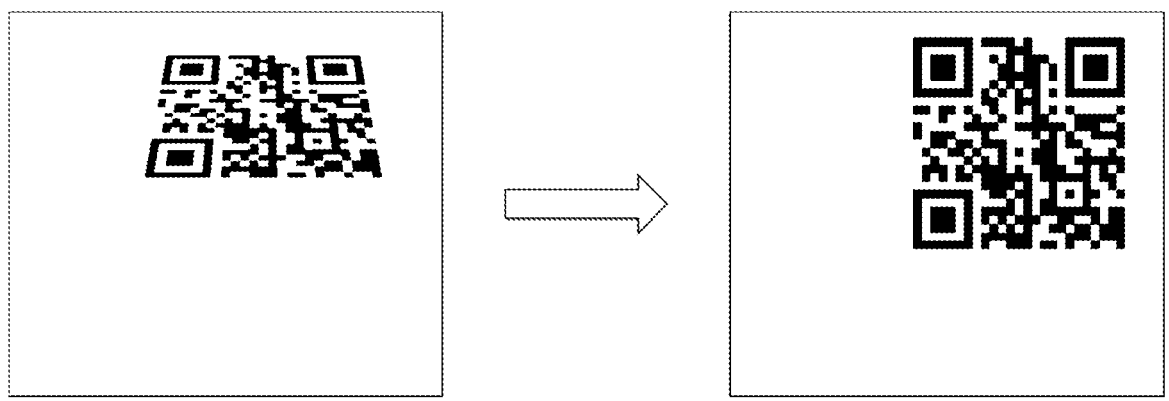
FIG. 3 is a schematic diagram showing a projective transformation of an marker according to an embodiment of the present disclosure.

Taking the QR code as an example, the robot is moved over the QR code before being started. A camera image is taken while the robot is being started. The camera is fixed on the robot and the ground is flat, therefore, an image coordinate system may be transformed into a top view coordinate system by projective transformation. That is, the following formula (1) is satisfied:

$$\begin{bmatrix} u \\ v \\ 1 \end{bmatrix} = H \begin{bmatrix} u' \\ v' \\ 1 \end{bmatrix}. \quad (1)$$

Where H is a 3×3 matrix describing the projective transformation between the camera and the real coordinates, u and v are pixels after the transformation, u' and v' are pixels before the transformation, and the coordinate transformation is performed via the 3×3 matrix H. Therefore, the original image can be transformed into a top view by the projective transformation, as shown in FIG. 3. FIG. 3 is a schematic diagram showing a projective transformation of a marker according to an embodiment of the present disclosure.

In the new graph, the image is facing right towards the QR code, and the actual ground distance corresponding to each pixel in the image is known. The pixel point (u, v) in the image corresponds to the unique coordinate (x, y) of the robot coordinate system, as shown in the following formula (2):

$$x = \frac{(u - u_0)}{f}, \ y = -\frac{v - v_0}{f}. \quad (2)$$

Where f is the focal length, that is, the actual distance corresponding to one pixel, $u_0$ and $v_0$ respectively refer to the abscissa and ordinate of the camera focal length center in the image, and are a part of the camera's parameters.

The above formula (2) may be written in the form of a matrix as the following formula (3):

$$\begin{bmatrix} x \\ y \\ 1 \end{bmatrix} = H_i \begin{bmatrix} u \\ y \\ 1 \end{bmatrix} = \frac{1}{f} \begin{bmatrix} 1 & 0 & -u_0 \\ 0 & -1 & y_0 \\ 0 & 0 & 1 \end{bmatrix} \begin{bmatrix} u \\ y \\ 1 \end{bmatrix}. \quad (3)$$

Where $H_i$ is the transformation matrix of the image coordinate system to the robot coordinate system.

Figure 4:
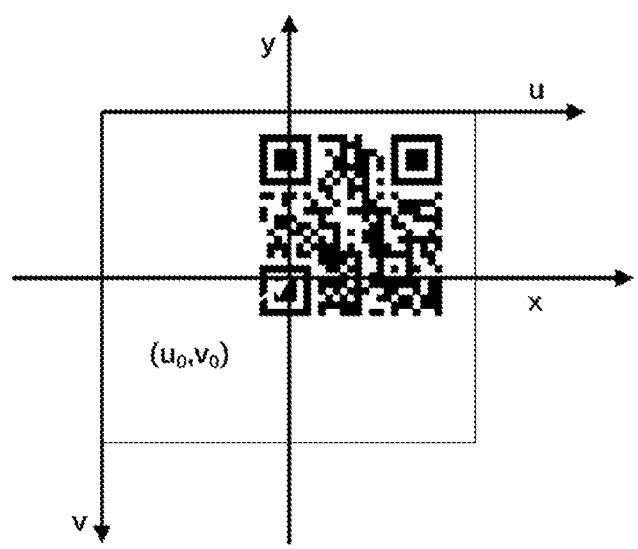
FIG. 4 is a schematic diagram showing a coordinate transformation of an marker image according to an embodiment of the present disclosure.

FIG. 4 is a schematic diagram showing a coordinate transformation of a marker image according to an embodiment of the present application. As shown in FIG. 4, $(u_0, v_0)$ is the coordinate of the origin of the robot coordinate system in the image. In the image coordinate system, u is the horizontal axis pointing right and v is the vertical axis pointing down. In the robot coordinate system, x is the horizontal axis pointing right and y is the vertical axis pointing up.

Next, whether the QR code exists in the image is detected. The QR code is scanned by a downward facing camera, and the coordinate (u, v, θ) of the QR code in the camera coordinate system are obtained. According to the transformation matrix $H_i$, the position of the QR code in the robot coordinate system can be obtained. Through an inverse transformation, the coordinates of the robot under the QR code can be obtained, as shown in the following formula (5):

$$\begin{bmatrix} x \\ y \\ 1 \end{bmatrix} = R^{-1} \cdot \begin{bmatrix} -1 & 0 & 0 \\ 0 & -1 & 0 \\ 0 & 0 & 1 \end{bmatrix} H_i \begin{bmatrix} u \\ v \\ 1 \end{bmatrix} = \quad (5)$$

-continued $$\begin{bmatrix} \cos\theta & \sin\theta & 0 \\ -\sin\theta & \cos\theta & 0 \\ 0 & 0 & 1 \end{bmatrix} \cdot \frac{1}{f} \cdot \begin{bmatrix} -1 & 0 & u_0 \\ 0 & 1 & -v_0 \\ 0 & 0 & 1 \end{bmatrix} \begin{bmatrix} u \\ v \\ 1 \end{bmatrix}.$$

Where the actual angle of the robot in the QR code coordinate system is −θ.

Initializing the used QR code, the actual coordinate information $(x_b, y_b, \theta_b)$ of the QR code in the scene is stored in the code word of the QR code, and the actual pose of the QR code in the scene is obtained by decoding the code word of the QR code. Therefore, the coordinates of the robot in the scene can be expressed as the following formula (6):

$$\begin{bmatrix} x_w \\ y_w \\ 1 \end{bmatrix} = \begin{bmatrix} \cos\theta_b & -\sin\theta_b & x_b \\ \sin\theta_b & \cos\theta_b & y_b \\ 0 & 0 & 1 \end{bmatrix} \cdot \begin{bmatrix} x \\ y \\ 1 \end{bmatrix} = \begin{bmatrix} \cos\theta_b & -\sin\theta_b & x_b \\ \sin\theta_b & \cos\theta_b & y_b \\ 0 & 0 & 1 \end{bmatrix} \quad (6)$$

$$\begin{bmatrix} \cos\theta & \sin\theta & 0 \\ -\sin\theta & \cos\theta & 0 \\ 0 & 0 & 1 \end{bmatrix} \cdot \frac{1}{f} \cdot \begin{bmatrix} -1 & 0 & u_0 \\ 0 & 1 & -v_0 \\ 0 & 0 & 1 \end{bmatrix} \begin{bmatrix} u \\ v \\ 1 \end{bmatrix}.$$

A heading angle of the robot in the scene equals a heading angle "−" of the robot in the two-dimensional code plus a heading angle $\theta_b$ of the QR code itself, as shown in the following formula (7):

$$\theta_w = \theta_b - \theta \quad (7).$$

At this point, when the robot is started at the position where the QR code is visible, the initial pose $(x_w, y_w, \theta_w)$ of the robot may be determined by the position of the QR code in the camera and the code word of the QR code, and the consistency of the overall system coordinate system may be ensured by starting the robot in this initial pose.

That is to say, if the marker includes the pose information, the located object uses the imaging device equipped therewith such as a camera to shoot the marker and obtain the pose information of the marker, and there exists a definite spatial relationship between the pose information of the located object and the pose information of the marker. Therefore, the initial pose information of the located object may be directly extracted from the pose information of the marker by performing a coordinate transformation of the pose information carried in the marker based on the imaged pose of the marker in the imaging device of the located object.

Here, it should be understood by those skilled in the art that the relative pose between the marker and the located object such as the above-mentioned robot may be determined by the imaging of the marker in the imaging device of the located object, or the relative pose between the marker and the robot may be determined in other manners, thereby extracting the pose information of the located object from the pose information of the marker via the coordinate transformation. And similarly, when the relative pose between the robot and the marker is determined in other manners, other forms of coordinate transformation may be employed to directly extract the pose information of the located object from the pose information of the marker.

Therefore, in the above-mentioned marker-combined SLAM navigation method, the first marker includes the pose information, and determining the initial pose of the located object based on the first marker includes: directly determining initial pose information of the located object by performing a coordinate transformation on the pose information carried in the first marker base on a relative pose between the first marker and the located object.

Moreover, in the above-mentioned marker-combined SLAM navigation method, the pose of the first marker relative to the located object is determined based on a pose of an image formed by the first marker in the imaging device prepared by the located object.

In addition, in the marker-combined SLAM navigation method according to the embodiment of the present application, the marker may include an ID without including pose information. In this case, when the robot is started from the marker, the ID carried in the marker is recorded, and in the SLAM process, the ID is used as the coordinate origin to locate and make a map. When the robot repeatedly passes the marker, the ID carried in the marker is used for matching to obtain each pose of the robot. A mean $\mu_w$ and covariance matrix $\Sigma_w$ of each pose of the robot are recorded and transformed to the corresponding mean and covariance matrix of the pose of the marker through the above-mentioned inverse coordinate transformation process. Then, the repeatedly obtained pose information of the marker is fused via the Gaussian model. An optimal pose estimation and a covariance matrix of the marker are estimated and transformed into a corresponding pose of the robot as the initial pose of the robot through the above-mentioned inverse coordinate transformation process.

Figure 5:
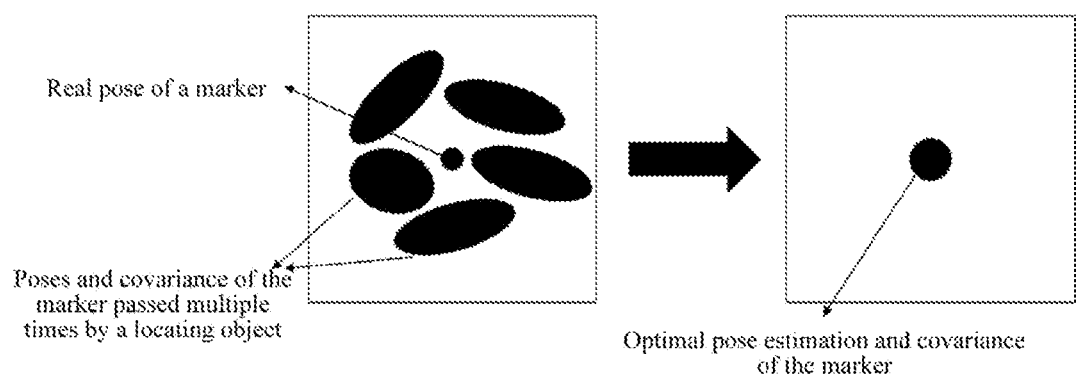
FIG. 5 is a schematic diagram showing a pose information fusion according to an embodiment of the present disclosure.

FIG. 5 is a schematic diagram showing a pose information fusion according to an embodiment of the present disclosure. As shown in FIG. 5, when the robot passes the marker five times, five different poses and errors (e.g., covariance matrixes) are obtained via the SLAM navigation locating. The pose and error after optimization (i.e., an optimal pose estimation and error) are obtained in the right figure as the real pose and an error of the marker via a fusion of poses. When the robot is started again from the marker, the optimal pose estimation of the marker is used as initialization pose information of the marker, and an initial pose and error of the robot are calculated according to the relative pose between the robot and the marker.

In an embodiment, the robot is assumed to have passed or observed the marker N times, the pose of the marker during the k-th passing or the k-th observation is defined to satisfy a two-dimensional Gaussian distribution, that is, $$p(p_k) \sim N(\mu_k, \sum\nolimits_k) = \frac{1}{(2\pi)^{d/2}|\Sigma_k|^{1/2}} \exp\left\{-\frac{1}{2}(p-\mu_k)^T \sum\nolimits_k^{-1}(p-\mu_k)\right\}.$$

Where $p(p_k)$ is the k-th pose probability distribution, $\mu_k$ is the pose mean, and $\Sigma_k$ is the covariance matrix. When the marker is passed or observed multiple times, the optimal estimation of the marker is:

$$p(p|p_1, p_2, \ldots, p_N).$$

Each observation is assumed to be independently distributed, and then the optimal estimation may be transformed into a product of multiple Gaussian distributions, that is:

$$p(p|p_1, p_2, \ldots, p_N) = \Pi_{k=1}^N p(p_k).$$

Here, based on the relative pose between the robot and the marker, the method of directly determining the initial pose information of the robot from the pose information carried in the marker has been described above, and thus will not be described herein.

Therefore, in the above-mentioned marker-combined simultaneous localization and mapping navigation method, the first marker includes the identification information, and determining the initial pose of the located object based on the first marker includes: using the identification information of the first marker for matching, recording a plurality of pieces of pose information and errors of the located object, and transforming the plurality of pieces of pose information and errors of the located object into a plurality of pieces of pose information and errors of the first marker; fusing the plurality of pieces of pose information of the first marker to estimate optimal pose information and an error of the first marker via a Gaussian model; and directly determining initial pose information of the located object by performing a coordinate transformation on the optimal pose information carried in the first marker base on a relative pose between the first marker and the located object.

In such way, if the first marker includes the pose information or the identification information, when the located object is started from the initialization area for the located object, the initial pose of the located object is determined based on the first marker, thereby solving the problem of unclear initialization pose of the located object.

As described above, in order to solve the locating deviation of the located object during the traveling process, one or more markers are added on the travelling path of the located object to perform locating deviation correction. Moreover, relative to that the marker at the initialization of the located object needs to include the pose information or identification information, the marker added on the travelling path of the located object may also include non-identification graphic information.

That is, in the above-mentioned marker-combined SLAM navigation method, the second marker includes the pose information, the identification information or the non-identification graphic information.

Meanwhile, in the above-mentioned marker-combined SLAM navigation method, the third marker includes the pose information, the identification information or the non-identification graphic information.

For the second marker including the pose information, when the located object passes the second marker, by using the method described above, the code word information may be extracted from the pose information of the second marker, and based on the pose of the second marker relative to the located object, the pose position of the located object is obtained, to directly correct the locating result.

For the second marker including the identification information, when the located object passes the second marker each time, the estimated pose and error (e.g., covariance matrix) of the located object are recorded and transformed to the pose and error (e.g., covariance matrix) of the second marker. After multiple fusions, a second marker including pose information ($x_b$, $y_b$, $\theta_b$) may be obtained. Then, through the obtained pose information and error (e.g., covariance matrix), the current pose of the located object may be directly updated. This method has also been described above, and thus will not be described again.

That is, in the above-mentioned marker-combined SLAM navigation method, the second marker includes the pose information, and updating the current pose of the located object based on the second marker includes: directly determining current pose information of the located object by performing a coordinate transformation on the pose information carried in the second marker based on a relative pose between the second marker and the located object.

Or, in the above-mentioned marker-combined SLAM navigation method, the second marker includes the identification information, and updating the current pose of the located object based on the second marker includes: using the identification information carried in the second marker for matching, obtaining and recording a plurality of pieces of pose information and errors of the located object, and transforming the plurality of pieces of pose information and errors of the located object into a plurality of pieces of pose information and errors of the second marker; fusing the plurality of pieces of pose information to estimate optimal pose information and an error of the second marker via a Gaussian model; and directly determining current pose information of the located object by performing a coordinate transformation on the optimal pose information carried in the second marker based on a relative pose between the second marker and the located object.

Figure 6A:
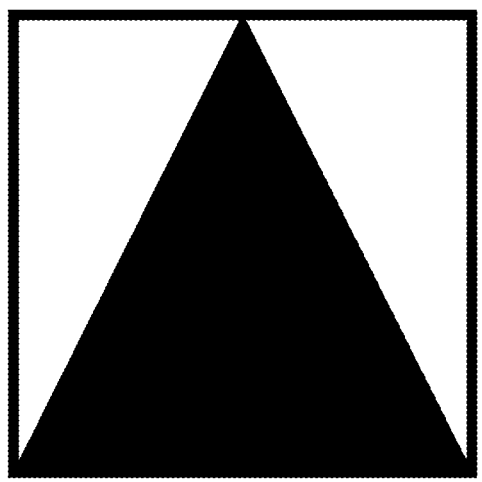
FIGS. 6A and 6B are schematic diagrams of a visual marker and a laser marker respectively according to an embodiment of the present disclosure.
Figure 6B:
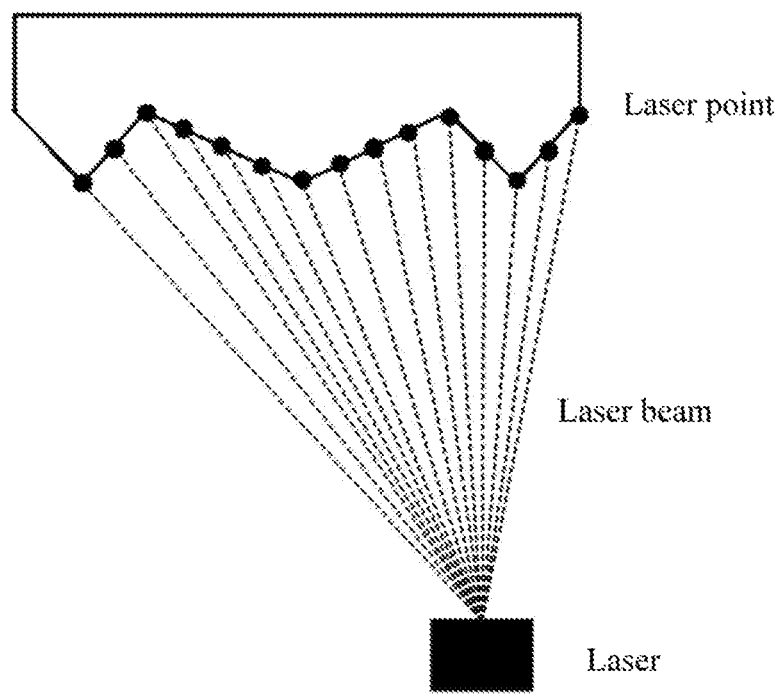

In addition, in the marker-combined simultaneous localization and mapping navigation method according to the present disclosure, the second marker may also be a marker including non-identification graphic information. The non-identification graphic information may not include any meaningful information. For example, the non-identification graphic information identification may be a regular graphic identification, and a plurality of regular graphic identifications described above may be added in the initialization area for a located object. For another example, the second marker may be a visual marker (regular graphic) or a laser marker (regular block). FIGS. 6A and 6B are schematic diagrams showing a visual marker and a laser marker respectively according to an embodiment of the present disclosure. As shown in FIG. 6A, the visual marker is a detectable graph with an orientation, and as shown in FIG. 6B, the laser marker is a regular block.

Figure 7A:
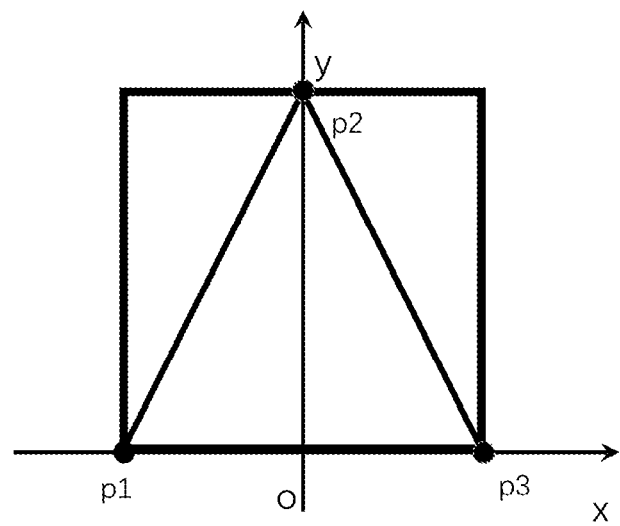
FIGS. 7A and 7B are schematic diagrams of coordinate systems defined for a visual marker and a laser marker respectively according to an embodiment of the present disclosure.

On a detection of the marker, for the visual marker as shown in FIG. 6A, three points ($p_1$, $p_2$, $p_3$) where the triangle intersects with the rectangle are detected and used as a basis to define a coordinate system as shown in FIG. 7A. The coordinate origin O is expressed in the following formula (8):

$$O = \frac{p_1 + p_3}{2}. \tag{8}$$

Where the x-axis orientation is $p_3-p_1$, and the y-axis orientation is $p_2-O$. The coordinates of the marker in the robot coordinate system is finally determined.

Figure 7B:
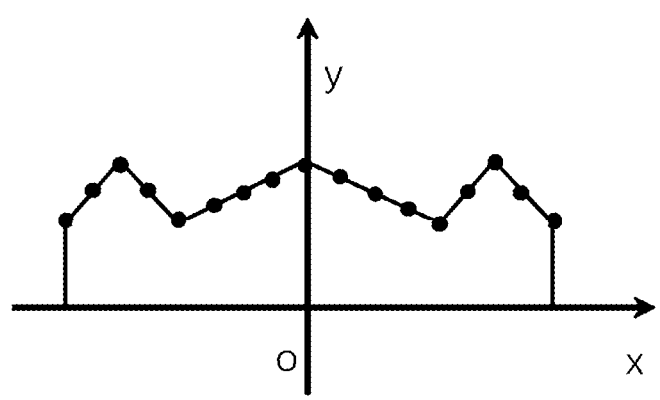

For laser marker, a coordinate system is defined as shown in FIG. 7B. At the same time, the marker block is discretized into a plurality of laser points. When a laser radar of the robot detects a similar pattern, a point cloud matching solution is used to detect the coordinates of the marker in the lidar coordinate system, and then calibration parameters are used to solve the coordinates of the marker in the robot coordinate system. FIGS. 7A and 7B are schematic diagrams of coordinate systems defined for a visual marker and a laser marker respectively according to an embodiment of the present disclosure.

Figure 8:
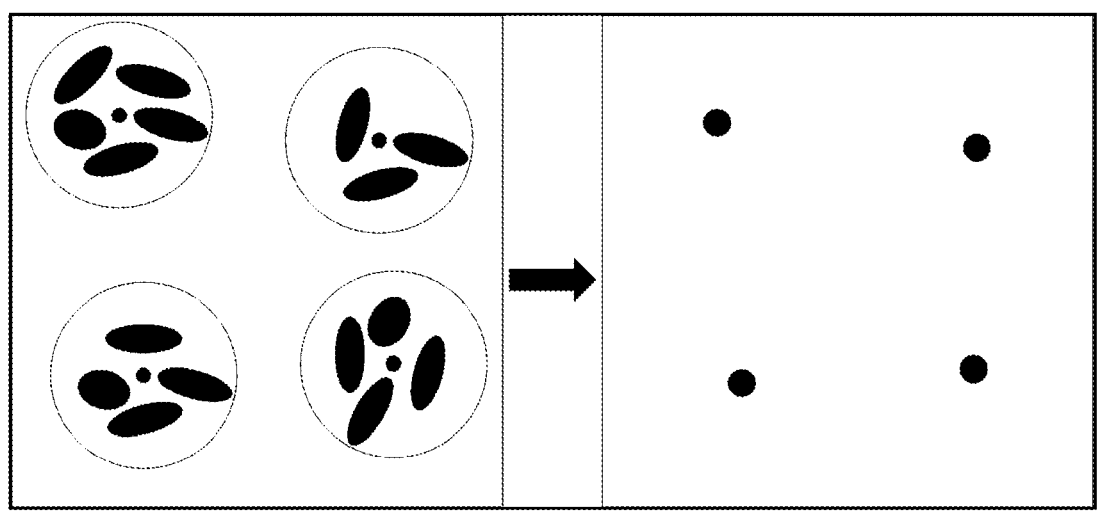
FIG. 8 is a schematic diagram of fusing poses of similar markers according to an embodiment of the present disclosure.

When the robot passes or observes the same marker multiple times, the poses of the marker repeatedly passed or observed by the robot may be used to optimize the pose of the marker. Different from the marker including the ID, the marker without the ID does not have a specific ID but needs the pose information for correspondence when matching is performed. As shown in FIG. 8, a certain positional interval exists between markers passed or observed multiple times by the robot. When the marker is detected by the robot, the pose of the robot is obtained and recorded. For the same marker, the multiple recorded poses of the robot are similar. The optimal locating estimation of the marker can be solved by fusing the information of similar poses. When the marker is detected again by the robot, a marker, closest to the robot, among the recorded markers is matched. When a distance is less than a certain threshold, the pose information of the marker is used to optimize the pose information of the robot; otherwise, a new marker is created. FIG. 8 is a schematic diagram showing fusing poses of similar markers according to an embodiment of the present disclosure.

That is to say, when the marker itself includes non-identification graphic information, the similarity of poses of the robot passing the marker is used to determine whether a same marker is passed. Or, it can be said that a similar pose of the robot passing the marker is used as a corresponding ID of the marker. Subsequent processes are essentially the same as the processes in the case described above where the marker includes the ID information. In an embodiment, after a same marker is determined, similar poses of the robot passing through the marker may be obtained, and after the transformation, the poses are fused to solve an optimal locating estimation of different markers. Therefore, if the marker does not include any information, the marker ID is essentially given by the similarity of the poses of the robot passing the marker, and the subsequent processes is the same as the processes in the case previously described where the marker includes the identification information.

Therefore, in the above-mentioned marker-combined SLAM navigation method, the second marker includes the non-identification graphic information, and updating the current pose of the located object based on the second marker includes: using a similarity of poses when the located object passes the same marker to determine whether an marker that the located object passes is the second marker; if the second marker is determined, recording a plurality of pieces of pose information and errors of the located object passing the second marker, and transforming the plurality of pieces of pose information and errors of the located object into a plurality of pieces of pose information and errors of the second marker; fusing the plurality of pieces of pose information of the second marker to estimate optimal pose information and an error of the second marker via the Gaussian model; and directly determining current pose information of the located object by performing a coordinate transformation on the optimal pose information carried in the second marker based on a relative pose between the second marker and the located object.

Moreover, in the marker-combined simultaneous localization and mapping navigation method according to the present disclosure, if a plurality of markers are provided on the travelling path of the located object, the pose of the located object passing each of the markers may be updated in the above-mentioned manner, thereby reducing the cumulative offset and achieving a closing detection of the SLAM system.

In addition, in an embodiment, the method further includes that: adding a third marker on the docking device on the travelling path of the located object; and when the located object passes the third marker, completing a docking operation with the docking device based on the third marker by the located object. For example, when the located object carries a handling item, in the case where the located object passes the third marker, a relative pose between the located object and the docking device can be adjusted based on the third marker to achieve precise docking.

In the SLAM navigation method according to the present disclosure, in order to meet a high-precision locating requirement such as a precise docking of a conveyor belt or a mechanical arm, one or more markers are added in the docking area to perform precise locating of the located object. The specific implementation is the same as that described above for the robot, and will not be described again in order to avoid redundancy.

In addition, in order to solve the problem of being unable to pass the marker due to excessive locating deviation when the robot travels, a ribbon may be added between the markers. In this way, when the located object (e.g. a robot) passes the ribbon, the angular deviation of the robot relative to the ribbon is corrected, and the robot is made to travel along the ribbon, thereby facilitating precise locating when the robot encounters the marker.

In an embodiment, when a plurality of second markers are provided, adding the second markers on the travelling path of the located object includes: adding the plurality of second markers on the travelling path of the located object. When the located object passes each of the second markers, updating the current pose of the located object based on each of the second markers further includes: when the located object passes the plurality of second markers, updating the current poses of the located object based on the plurality of second markers. For example, the plurality of second markers may be of two types.

Figure 9A:
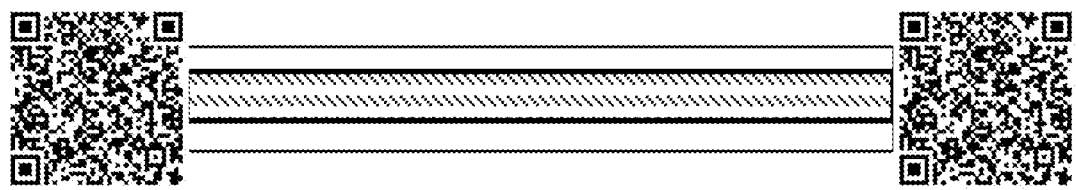
FIGS. 9A and 9B are schematic diagrams showing a manner of connection between markers and a ribbon according to an embodiment of the present disclosure.
Figure 9B:
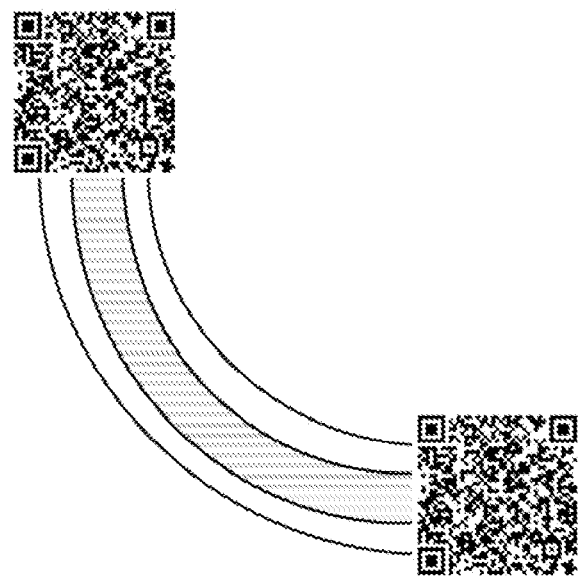

FIGS. 9A and 9B are schematic diagrams showing a manner of connection between markers and a ribbon respectively according to an embodiment of the present disclosure. As shown in FIGS. 9A and 9B, two typical manners of connecting markers (e.g., two-dimensional codes) and a ribbon are shown. FIG. 9A shows the manner of a linear connection, that is, when two markers are in the same x or y direction, a linear ribbon is directly used to connect the two markers. Additionally, FIG. 9B shows a curved connection, that is, when the two markers are consistent in neither the x nor the y direction, or the angles are not consistent, a smooth curve ribbon connection may be used. Of course, it should be understood by those skilled in the art that the connection manners of the ribbon is not limited to these two connection manners. The ribbon curve just needs to be smooth so that the robot may travel along the ribbon.

Figure 10:
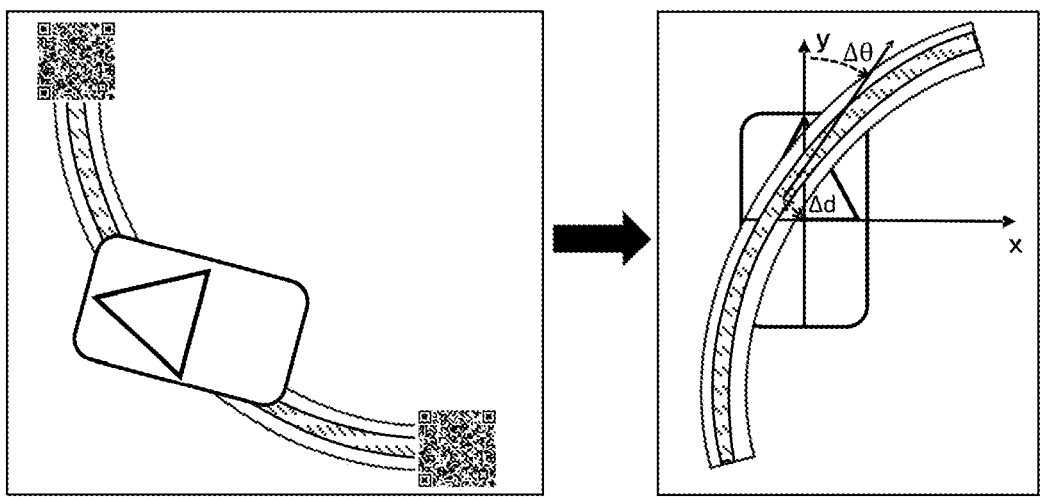
FIG. 10 is a schematic diagram of calculating a deviation between a robot and a ribbon according to an embodiment of the present disclosure.

The ribbon curve is detected when the robot passes the ribbon. A closest point to the robot is found by searing the curve, and this point is used to calculate a positional deviation $\Delta d$ and angular deviation $\Delta \theta$ between the robot and the ribbon (as shown in FIG. 10). At the same time, the curvature C of the ribbon is detected. If the robot is right above the ribbon, that is, $\Delta d=0$ and $\Delta \theta=0$, the purpose of traveling along the ribbon can be achieved by tracking the curvature of the ribbon. Taking a two-wheel differential robot as an example, control parameters are velocity v and angular velocity w, and an open-loop tracking method satisfies that $w=v \cdot C$. A deviation will be produced in an actual control process, and a certain deviation also exists between the initial position of the robot and the ribbon. Therefore, on the basis of the open loop locating that $w=v \cdot C$, the positional deviation $\Delta d$ and the angular deviation $\Delta \theta$ are used as the control quantities to perform a Proportion Integration Differentiation (PID) control. A simple method is shown in the following formula (9):

$$w=v \cdot C+\lambda_1 \cdot (-\Delta d)+\lambda_2 \Delta \theta \qquad (9).$$

Where $\lambda_1$ and $\lambda_2$ are two parameters, which represent control weights caused by the control angle deviation and position deviation.

By this method, the robot can travel along the ribbon, ensuring that when the robot travels to the end of the ribbon, the marker at the end can be detected. When the marker is passed, the pose of the robot can be corrected based on the manner described above. FIG. 10 is a schematic diagram of calculating a deviation between a robot and a ribbon according to an embodiment of the present disclosure. Therefore, in the above-mentioned marker-combined simultaneous localization and mapping navigation method, an auxiliary locating belt connecting the plurality of second markers is included between two adjacent second markers among the plurality of second markers for correcting an angular deviation of the located object relative to the auxiliary locating belt as the located object passes the auxiliary locating belt such that the located object travels along the auxiliary locating belt, ensuring that the plurality of second markers may be passed and identified by the located object.

In another embodiment, the plurality of second markers may include not only two types of markers, but at least two types of markers. The at least two types of markers may be set in positions in different shapes such as a matrix, a rectangle, and the like, and an auxiliary locating belt is set between any two types of markers. With the marker-combined SLAM navigation method according to the embodiment of the present application, the locating precision and robustness of the SLAM navigation system may be improved and adapted to an industrial environment requiring precise locating.

In another aspect of the present disclosure, a marker-combined simultaneous localization and mapping navigation device is provided, which includes: an initialization area providing unit, configured to provide an initialization area for a located object; a first marker adding unit, configured to add a first marker in the initialization area for a located object, where the first marker includes pose information or identification information; a located object starting unit, configured to enable the located object to start from the initialization area for the located object, and determine an initial pose of the located object based on the first marker; a second marker adding unit, configured to add a second marker on a travelling path of the located object; and a pose updating unit, configured to update a current pose of the located object based on the second marker when the located object passes the second marker.

Figure 11:
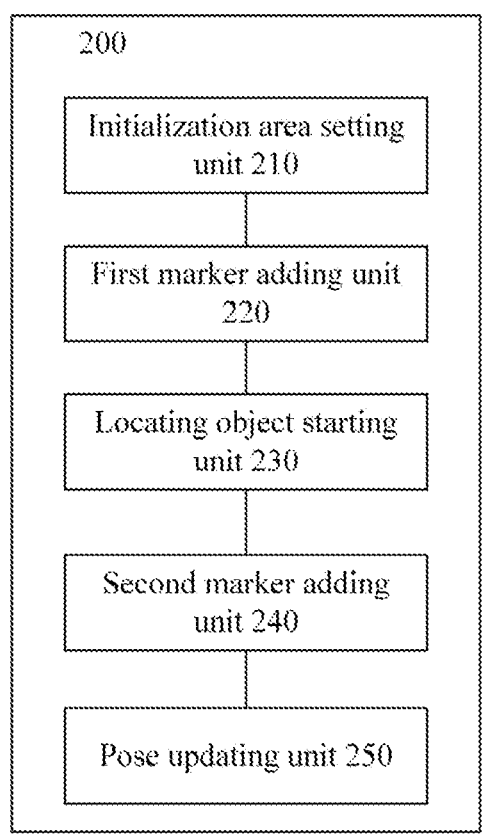
FIG. 11 is a block diagram showing a marker-combined simultaneous localization and mapping navigation device according to an embodiment of the present disclosure.

FIG. 11 is a block diagram showing a marker-combined simultaneous localization and mapping navigation device according to an embodiment of the present application. As shown in FIG. 11, according to the embodiment of the present application, the marker-combined simultaneous localization and mapping navigation device 200 includes: an initialization area setting unit 210, configured to provide an initialization area for a located object; a first marker adding unit 220, configured to add a first marker in the initialization area for a located object provided by the initialization area setting unit 210, where the first marker includes pose information or identification information; a located object starting unit 230, configured to enable the located object start from the initialization area for a located object provided by the initialization area setting unit 210, and determine an initial pose of the located object based on the first marker added by the first marker adding unit 220; a second marker adding unit 240, configured to add a second marker on a travelling path of the located object; and a pose updating unit 250, configured to, update a current pose of the located object based on the second marker when the located object passes the second marker added by the second marker adding unit 240.

In the above-mentioned marker-combined simultaneous localization and mapping navigation device, the located object is a robot that travels in simultaneous localization and mapping navigation and a mobile device that carries a conveyor belt or a mechanical arm.

In the above-mentioned marker-combined simultaneous localization and mapping navigation device, the first marker includes the pose information, and the located object starting unit is configured to: directly determine initial pose information of the located object by performing a coordinate transformation on the pose information carried in the first marker base on a relative pose between the first marker and the located object.

In the above-mentioned marker-combined simultaneous localization and mapping navigation device, the first marker includes the identification information, and the located object starting unit is configured to: use the identification information carried in the first marker for matching, record a plurality of pieces of pose information and errors of the located object, and transform the plurality of pieces of pose information and errors of the located object into a plurality of pieces of pose information and errors of the first marker; fuse the plurality of pieces of pose information of the first marker to estimate optimal pose information and an error of the first marker via a Gaussian model; and directly determine initial pose information of the located object by performing a coordinate transformation on the pose information carried in the first marker base on a relative pose between the first marker and the located object.

In the above-mentioned marker-combined simultaneous localization and mapping navigation device, the second marker includes the pose information, the identification information or non-identification graphic information.

In the above-mentioned marker-combined simultaneous localization and mapping navigation device, the second marker includes the pose information, and the pose updating unit is configured to: directly determine current pose information of the located object by performing a coordinate transformation on the pose information carried in the second marker based on a relative pose between the second marker and the located object.

In the above-mentioned marker-combined simultaneous localization and mapping navigation device, the second marker includes the identification information, and the pose updating unit is configured to: use the identification information carried in the second marker for matching, record a plurality of pieces of pose information and errors of the located object, and transform the plurality of pieces of pose information and errors of the located object into a plurality of pieces of pose information and errors of the second marker; fuse the plurality of pieces of pose information to estimate optimal pose information and an error of the second marker via a Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation device, the second marker includes the non-identification graphic information, and the pose updating unit is configured to: use a similarity of poses when the located object passes the same marker to determine whether a marker that the located object passes is the second marker; record a plurality of pieces of pose information and errors of the located object passing the second marker, and transform the plurality of pieces of pose information and errors of the located object into a plurality of pieces of pose information and errors of the second marker; fuse the plurality of pieces of pose information of the second marker to estimate optimal pose information and an error of the second marker via the Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation device, when a plurality of second markers are provided, the first marker adding unit is configured to add the plurality of second markers on the travelling path of the located object, and the pose updating unit is further configured to update the current poses of the located object based on the plurality of second markers when the located object passes the plurality of second markers.

In the above-mentioned marker-combined simultaneous localization and mapping navigation device, an auxiliary locating unit is further included and configured to add an auxiliary locating belt connecting two adjacent second markers among the plurality of second markers and correct an angular deviation of the located object relative to the auxiliary locating belt as the located object passes the auxiliary locating belt, such that the located object travels along the auxiliary locating belt to ensure that the second marker may be passed and identified by the located object.

The above-mentioned marker-combined simultaneous localization and mapping navigation device further includes a third marker adding unit, configured to add a third marker onto the docking device on the travelling path of the located object; and a docking unit, configured to complete a docking operation with the docking device based on the third marker when the located object passes the third marker.

Here, it should be understood by those skilled in the art that in the simultaneous localization and mapping navigation device according to the embodiment of the present disclosure, the first marker adding unit and the second marker adding unit may be integrated as a same marker adding unit for adding markers, and a part of the functions in the located object starting unit may also be carried in the pose updating unit for updating position information of the located object based on the markers.

In addition, it should be understood by those skilled in the art that other details of the marker-combined simultaneous localization and mapping navigation device according to an embodiment of the present disclosure are the same as the corresponding details previously described in the marker-combined simultaneous localization and mapping navigation method according to an embodiment of the present disclosure, and will not described again to avoid redundancy.

In another aspect, the present disclosure provides an marker-combined simultaneous localization and mapping navigation system, including: a located object configured to locate and build a map in real time in a scene; a first marker including pose information or identification information; a second marker; and a simultaneous localization and mapping device. The simultaneous localization and mapping device includes an initialization area setting unit, configured to provide an initialization area for a located object; a first marker adding unit, configured to add a first marker in the initialization area for a located object; a located object starting unit, configured to enable the located object to start from the initialization area for the located object, and determine an initial pose of the located object based on the first marker; a second marker adding unit, configured to add a second marker on a travelling path of the located object; and a pose updating unit, configured to update a current pose of the located object based on the second marker when the located object passes the second marker.

Figure 12:
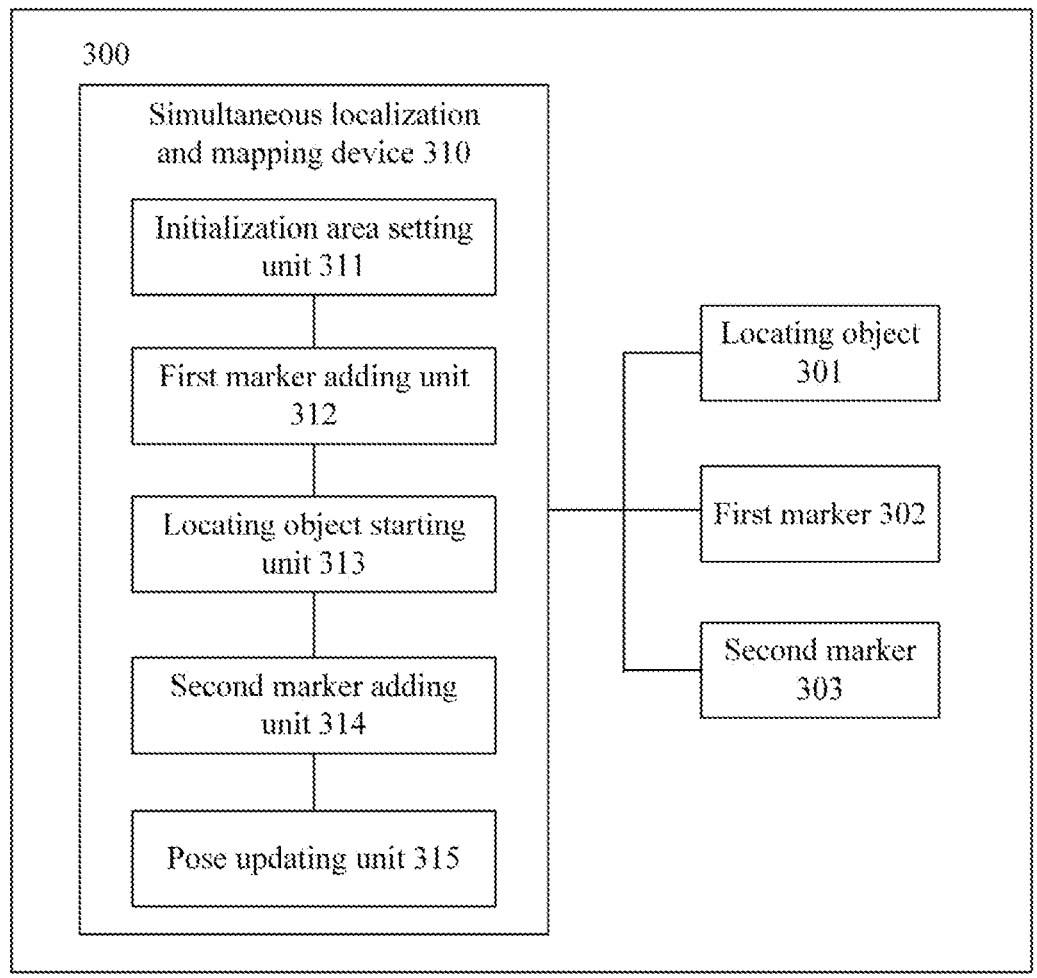
FIG. 12 is a block diagram showing a marker-combined simultaneous localization and mapping navigation system according to an embodiment of the present disclosure.

FIG. 12 is a block diagram showing a marker-combined simultaneous localization and mapping navigation system according to an embodiment of the present disclosure. As shown in FIG. 12, according to the embodiment of the present disclosure, the marker-combined simultaneous localization and mapping navigation system 300 includes: a located object 301 configured to locate and build a map in real time in a scene; a first marker 302 including pose information or identification information; a second marker 303; and a simultaneous localization and mapping device 310. The simultaneous localization and mapping device 310 includes: an initialization area setting unit 311, configured to provide an initialization area for a located object; a first marker adding unit 312, configured to add a first marker in the initialization area for a located object provided by the initialization area setting unit 311; a located object starting unit 313, configured to enable the located object start from the initialization area for the located object provided by the initialization area setting unit 311, and determine an initial pose of the located object 301 based on the first marker 302 added by the first marker adding unit 312; a second marker adding unit 314, configured to add a second marker 303 on a travelling path of the located object; and a pose updating unit 315, configured to, update a current pose of the located object 301 based on the second marker 303 when the located object 301 passes the second marker 303 added by the second marker adding unit 314.

In the above-mentioned marker-combined simultaneous localization and mapping navigation system, the located object is a robot that travels in simultaneous localization and mapping navigation and a mobile device that carries a conveyor belt or a mechanical arm.

In the above-mentioned marker-combined simultaneous localization and mapping navigation system, the first marker includes the pose information, and the located object starting unit is further configured to: directly determine initial pose information of the located object by performing a coordinate transformation on the pose information carried in the first marker base on a relative pose between the first marker and the located object.

In the above-mentioned marker-combined simultaneous localization and mapping navigation system, the first marker includes the identification information, and the located object starting unit is further configured to: use the identification information carried in the first marker for matching, record a plurality of pieces of pose information and errors of the located object, and transform the plurality of pieces of pose information and errors of the located object into a plurality of pieces of pose information and errors of the first marker; fuse the plurality of pieces of pose information of the first marker to estimate an optimal pose information and error of the first marker via a Gaussian model; and directly determine initial pose information of the located object by performing a coordinate transformation on the optimal pose information carried in the first marker based on a relative pose between the first marker and the located object.

In the above-mentioned marker-combined simultaneous localization and mapping navigation system, the second marker includes the pose information, the identification information or non-identification graphic information.

In the above-mentioned marker-combined simultaneous localization and mapping navigation system, the second marker includes the pose information, and the pose updating unit is further configured to: directly determine current pose information of the located object by performing a coordinate transformation on the pose information carried in the second marker based on a relative pose between the second marker and the located object.

In the above-mentioned marker-combined simultaneous localization and mapping navigation system, the second marker includes the identification information, and the pose updating unit is further configured to: use the identification information carried in the second marker for matching, record a plurality of pieces of pose information and errors of the located object, and transform the plurality of pieces of pose information and errors of the located object into a plurality of pieces of pose information and errors of the second marker; fuse the plurality of pieces of pose information to estimate an optimal pose information and error of the second marker via a Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation system, the second marker includes the non-identification graphic information, and the pose updating unit is further configured to: use a similarity of poses when the located object passes the same marker to determine whether an marker that the located object passes is the second marker; record a plurality of pieces of pose information and errors of the located object passing the second marker, and transform the plurality of pieces of pose information and errors of the located object into a plurality of pieces of pose information and errors of the second marker; fuse the plurality of pieces of pose information of the second marker to estimate optimal pose information and an error of the second marker via the Gaussian model; and directly determine current pose information of the located object by performing a coordinate transformation on the optimal pose information carried in the second marker based on a relative pose between the second marker and the located object.

In the above-mentioned marker-combined simultaneous localization and mapping navigation system, when a plurality of second markers are provided, the first marker adding unit is configured to add the plurality of second markers on the travelling path of the located object, and the pose updating unit is further configured to update the current poses of the located object based on the plurality of second markers when the located object passes the plurality of second markers.

In the above-mentioned marker-combined simultaneous localization and mapping navigation system, an auxiliary locating belt is included between two adjacent second markers among the plurality of second markers, and the simultaneous localization and mapping device further includes: an auxiliary locating unit configured to correct an angular deviation of the located object relative to the auxiliary locating belt as the located object passes the auxiliary locating belt, such that the located object travels along the auxiliary locating belt.

In the above-mentioned marker-combined simultaneous localization and mapping navigation system, the simultaneous localization and mapping device further includes: a third marker adding unit, configured to add a third marker onto the docking device on the travelling path of the located object; and a docking unit, configured to complete a docking operation with the docking device based on the third marker when the located object passes the third marker.

In addition, it should be understood by those skilled in the art that other details of the marker-combined simultaneous localization and mapping navigation device according to the present disclosure are the same as the corresponding details previously described in the marker-combined simultaneous localization and mapping navigation method according to the present disclosure, and will not described again to avoid redundancy.

The marker-combined simultaneous localization and mapping navigation method, device and system provided by the present disclosure may improve the locating precision and robustness of the simultaneous localization and mapping navigation system which can be adapted to an industrial environment requiring precise locating.

It should be understood by those skilled in the art that the embodiments of the present disclosure described in the above description and drawings are by way of example only and not intended to limit the present disclosure. The purpose of the present disclosure has been achieved completely and efficiently. The function and structural principle of the present application have been shown and illustrated in the embodiments, and the embodiments of the present disclosure may be altered or modified without departing from the principle.

What is claimed is:

1. A marker-combined simultaneous localization and mapping (SLAM) navigation method, comprising:
   providing an initialization area for a located object;
   adding a first maker in the initialization area for the located object, wherein the first marker comprises: pose information or identification information;
   starting from the initialization area for the located object, and determining an initial pose of the located object based on the first marker;
   adding a second marker on a travelling path of the located object; and
   in response to the located object passing the second marker, updating a current pose of the located object based on the second marker.

2. The method of claim 1, wherein the located object comprises a robot that travels in simultaneous localization and mapping navigation and a mobile device that needs to dock with the docking device.

3. The method of claim 1, wherein the docking device comprises a conveyor belt or a mechanical arm.

4. The method of claim 1, wherein the first marker comprises the pose information, and
   the determining the initial pose of the located object based on the first marker comprises:
   directly determining initial pose information of the located object by performing a coordinate transformation on the pose information carried in the first marker base on a relative pose between the first marker and the located object.

5. The method of claim 1, wherein the first marker comprises the identification information, and the determining the initial pose of the located object based on the first marker comprises:
   when the located object starts from the first marker, recording the identification information carried in the first marker, and locate and make a map by using the identification information as a coordinate origin;
   when the located object repeatedly passes the first marker for multiple times, obtain the pose information of the located object by using the identification information carried in the first marker to perform matching, recording a plurality of pieces of pose information and errors of the located object, and transforming the plurality of pieces of pose information and errors of the located object into a plurality of pieces of pose information and errors of the first marker;

fusing the plurality of pieces of pose information of the first marker via a Gaussian model to estimate optimal pose information and an error of the first marker; and directly determining initial pose information of the located object by performing a coordinate transformation on the optimal pose information carried in the first marker based on a relative pose between the first marker and the located object.

6. The method of claim 1, wherein the second marker comprises the pose information, and the updating the current pose of the located object based on the second marker comprises:

directly determining current pose information of the located object by performing a coordinate transformation on the pose information carried in the second marker based on a relative pose between the second marker and the located object.

7. The method of claim 1, wherein the second marker comprises the identification information, and the updating the current pose of the located object based on the second marker comprises:

when the located object repeatedly passes the second marker, obtaining pose information of the located object by using the identification information carried in the second marker to perform matching, recording a plurality of pieces of pose information and errors of the located object, and transforming the plurality of pieces of pose information and errors of the located object into a plurality of pieces of pose information and errors of the second marker;

fusing the plurality of pieces of pose information of the second marker to estimate optimal pose information and an error of the second marker via a Gaussian model; and directly determining current pose information of the located object by performing a coordinate transformation on the optimal pose information carried in the second marker based on a relative pose between the second marker and the located object.

8. The method of claim 1, wherein the second marker comprises the non-identification graphic information, and the updating the current pose of the located object based on the second marker comprises:

determining whether a marker that the located object repeatedly passes for multiple times is the second marker by using a similarity of poses of the located object when the located object passes a same marker;

in a case where the second marker is determined, recording a plurality of pieces of pose information and errors of the located object passing the second marker, and transforming the plurality of pieces of pose information and errors of the located object into a plurality of pieces of pose information and errors of the second marker;

fusing the plurality of pieces of pose information of the second marker to estimate optimal pose information and an error of the second marker via a Gaussian model; and directly determining current pose information of the located object by performing a coordinate transformation on the optimal pose information carried in the second marker based on a relative pose between the second marker and the located object.

9. The method of claim 1, a plurality of second markers are provided.

10. The method of claim 9, wherein an auxiliary locating belt connecting two adjacent second markers is provided between the two adjacent second markers among the plurality of second markers for correcting an angular deviation of the located object relative to the auxiliary locating belt as the located object passes the auxiliary locating belt, such that the located object travels along the auxiliary locating belt.

11. A marker-combined simultaneous localization and mapping navigation system, comprising:

a located object, configured to locate and build a map in real time in a scene;

a marker, comprising at least one of a first marker and a second marker; and a simultaneous localization and mapping device, comprising:

an initialization area setting unit, configured to provide an initialization area for a located object;

a first marker adding unit, configured to add the first marker in the initialization area for the located object, wherein the first marker includes pose information or identification information;

a located object starting unit, configured to enable the located object start from the initialization area for the located object and determine an initial pose of the located object based on the first marker;

a second marker adding unit, configured to add the second marker on a travelling path of the located object; and a pose updating unit, configured to update a current pose of the located object based on the second marker when the located object passes the second marker.

12. The system of claim 11, wherein the located object comprises a robot that travels in simultaneous localization and mapping navigation and a mobile device that needs to dock with the docking device.

13. The system of claim 11, wherein the docking device comprises a conveyor belt or a mechanical arm.

14. The system of claim 11, wherein the first marker comprises the pose information, and wherein the located object starting unit is configured to:

directly determine initial pose information of the located object by performing a coordinate transformation on the pose information carried in the first marker base on a relative pose between the first marker and the located object.

15. The system of claim 11, wherein the first marker comprises the identification information, and wherein the located object starting unit is configured to:

when the located object starts from the first marker, record identification information comprised in the first marker, and locate and make a map by using the identification information as a coordinate origin;

when the located object repeatedly passes the first marker for multiple times, obtain pose information of the located object by using the identification information carried in the first marker to perform matching, record a plurality of pieces of pose information and errors of the located object, and transform the plurality of pieces of pose information and errors of the located object into a plurality of pieces of pose information and errors of the first marker;

fuse the plurality of pieces of pose information of the first marker to estimate optimal pose information and an error of the first marker via a Gaussian model; and directly determine initial pose information of the located object by performing a coordinate transformation on the optimal pose information carried in the first marker based on a relative pose between the first marker and the located object.

16. The system of claim 11, wherein the second marker comprises the pose information, and wherein the pose updating unit is further configured to:
   directly determine current pose information of the located object by performing a coordinate transformation on the pose information carried in the second marker based on a relative pose between the second marker and the located object.

17. The system of claim 11, wherein the second marker comprises the identification information, and wherein the pose updating unit is further configured to:
   when the located object repeatedly passes the second marker for multiple times, obtain pose information of the located object by using the identification information carried in the second marker to perform matching, record a plurality of pieces of pose information and errors of the located object, and transform the plurality of pieces of pose information and errors of the located object into a plurality of pieces of pose information and errors of the second marker;
   fuse the plurality of pieces of pose information of the second marker to estimate optimal pose information and an error of the second marker via a Gaussian model; and
   directly determine current pose information of the located object by performing a coordinate transformation on the optimal pose information carried in the second marker based on a relative pose between the second marker and the located object.

18. The system of claim 11, wherein the second marker comprises the non-identification graphic information, and wherein the pose updating unit is further configured to:
   determine whether a marker that the located object repeatedly passes for multiple times is the second marker by using a similarity of poses of the located object when the located object passes a same marker;
   in a case where the second marker is determined, record a plurality of pieces of pose information and errors of the located object passing the second marker, and transform the plurality of pieces of pose information and errors of the located object into a plurality of pieces of pose information and errors of the second marker;
   fuse the plurality of pieces of pose information of the second marker to estimate optimal pose information and an error of the second marker via a Gaussian model; and
   directly determine current pose information of the located object by performing a coordinate transformation on the optimal pose information carried in the second marker based on a relative pose between the second marker and the located object.

19. The system of claim 11, wherein a plurality of second markers are provided.

20. The system of claim 19, wherein an auxiliary locating belt is provided between two adjacent second markers among the plurality of second markers, and wherein the simultaneous localization and mapping device further comprises:
   an auxiliary locating unit, configured to correct an angular deviation of the located object relative to the auxiliary locating belt as the located object passes the auxiliary locating belt such that the located object travels along the auxiliary locating belt.

* * * * *